United States Patent Office 2,978,396
Patented Apr. 4, 1961

2,978,396

RADIATION INDUCED ETHYLENE POLYMERIZATION

James E. Shewmaker, Fanwood, and Joseph F. Nelson, Westfield, N.J., assignors to Esso Research and Engineering Company, a corporation of Delaware No Drawing. Filed Dec. 18, 1956, Ser. No. 628,968

8 Claims. (Cl. 204—154)

This invention relates to hydrocarbon radiation chemistry. It is particularly concerned with the conversion of ethylene by high energy ionizing radiation. According to this invention, ethylene is readily and effectively polymerized to high molecular weights under the influence of an organic peroxide and radiation, such as beta rays, neutrons and particularly gamma rays.

In brief compass, this invention proposes a process which comprises polymerizing ethylene by exposure to high energy ionizing radiation, preferably comprising gamma rays, in the presence of a promoting amount of a di-tertiary alkyl peroxide. The peroxide is present in an amount of at least 0.01 wt. percent, based on ethylene in the reaction mixture.

In this manner polyethylene is prepared. This product is a useful plastic used as an electrical insulator and fabricating material. Self-supporting films useful in packaging, and also pipe, nuts, washers, kitchen utensils and many other useful articles can be prepared from the solid polyethylene thus produced.

Under other polymerization conditions described herein, a product oil useful as a lubricant or a wax is produced.

It has now been found that when ethylene is polymerized by ionizing radiation such as gamma rays in the absence of conventional polymerization catalysts, the presence of a select peroxide greatly accelerates the polymerization. It is believed that the peroxide is responsible for initiating a greater number of chain starts.

Of the olefins so far investigated, ethylene appears to be the only one that responds to promotion by peroxides during radiation induced polymerization, and the di-tertiary alkyl peroxides appear to be unique in effecting this promotion. For example, experiments so far have shown that propylene polymerizations do not respond to promotion by di-tertiary alkyl peroxides, and other experiments have shown that other organic peroxides, such as tertiary butyl hydroperoxide and dicumyl peroxide, to be either without effect or detrimental during the radiation induced polymerization of ethylene. This selectivity is surprising and unexpected, and at present is unexplainable.

Ethylene can be obtained in any convenient manner known to the art, such as high temperature cracking of hydrocarbons. For example, paraffin waxes or petroleum fractions such as heavy residua, naphthas or gas oils can be cracked at temperatures above about 850° F. to obtain this raw material.

While mixtures of ethylene with other olefins can be converted, it is preferred to convert substantially pure ethylene. The concentration of the olefin, excluding the peroxide, in the reactants, is preferably at least 5 wt. percent.

The peroxide used is a di-tertiary-alkyl peroxide having the formula:

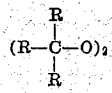

The alkyl radicals (R) preferably have from 1 to 10 carbon atoms, and can be alike or different. The radicals are preferably saturated, and unsubstituted. Examples are di-tertiary butyl peroxide and

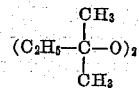

The peroxide is generally used in an amount of at least 0.01 wt. percent based upon olefin feed. Quantities up to 15% can be used.

The conditions may be adjusted to carry out the polymerization in either the liquid or vapor phase. One feature of this invention is that the polymerization of ethylene or its admixture with other olefins can be carried out at pressures substantially lower than those used by the prior art in the absence of radiation. The pressure can range from 50 to 10,000 p.s.i.g., with 1,000 to 6,000 p.s.i.g. being preferred. The temperature of the reaction is adjusted to correspond with the pressure, and can range from −30 to 360° C. As temperature increases, the molecular weight of the product tends to decrease. For this reason, the temperature can be varied over a wide range to produce solid, waxy or liquid products.

By high energy ionizing radiation is meant radiation from terrestrial sources consisting of photons having a wave length less than 50 A. such as gamma and X-rays, rapidly moving charged or uncharged particles of an atomic or subatomic nature having an energy above 30 e.v. such as beta rays, and neutrons, of sufficient intensity such that the dose rate is at least 100 equivalent roentgens per hour. This excludes radiations such as cosmic and ultraviolet which are ineffectual for the purposes of this invention.

When the dose rate is below about 25 equivalent roentgens per hour, the polymerization rate is so low or negligible that no promoting effect by the peroxide is obtainable or noticeable.

High energy ionizing radiation can be obtained from nuclear reactors, artificial accelerators, such as Van de Graaff generators; from X-ray machines, from waste materials from nuclear reactors, such as spent fuel elements or portions thereof; or from artificially produced isotopes, such as cobalt 60. The dose received by the product is in the range of 0.001 to 10 kwh./lb., preferably 0.01 to 1. The amount of radiation received is sufficient to yield a product having a molecular weight in the range of $10^2$ to $10^6$ (Staudinger).

When essentially gamma rays are used, it is preferred that the gamma ray flux in the reaction zone be above 100,000 equivalent roentgens per hour (r./hr.) to achieve a rapid polymerization rate. However, lower radiation dose rates are usable, although requiring undesirably long reaction times. The material can be exposed to irradiation either batchwise or continuously. When using a radioisotope, the reactant stream can be flowed in or around the radioisotope in suitable conduits or containers. Conventional irradiation apparatus can be utilized. For example, a suitable cobalt-60 irradiation source is described by Ghormley et al., Rev. Sci. Instr. 22, 473 (1951).

The reaction also proceeds by exposure to neutrons, with or without gamma rays, obtained from a nuclear reactor such as an atomic pile. The reactant stream can be flowed in pipes through, around, or near the fissionable material. Moderators for the reactor such as carbon, water, or hydrocarbons can be employed. In some cases, the feed stream itself can serve as a moderator. With a nuclear reactor, it is preferred to have a neutron flux in the reaction zone of at least $10^{10}$ neutrons/cm.²/sec. to achieve a rapid polymerization rate. However, lower fluxes are usable, requiring however, reaction times so long as to be undesirable in a number of cases.

Under these conditions an improved yield of polymer is obtained, which is greater than that obtained in the absence of the di-tertiary alkyl peroxide or by the prior art's teachings. The product is a solid when lower temperatures (below 100° C.) and/or higher pressures (above 500 p.s.i.g.) are used, and it has a molecular weight in the range of 2,000 to 100,000. At low pressures and especially at high temperatures or a combination of the two, liquid polymers are obtained, the yields being improved by the presence of the peroxide. Such liquid products are valuable as lubricants, plasticizers, hydraulic fluids, or as olefins for use in chemical syntheses.

After being irradiated, the polymeric product can be treated as desired. Such means as washing and drying can be employed. One advantage of the process described in this invention is that polymer contains no inorganic ash that needs to be removed. Thus, the electrical properties of the polymer are excellent, because complete removal of ash from polyethylene is not readily and commercially obtainable. Unreacted olefin, if any, can be recovered and recycled. No treatment to remove induced radioactivity is normally necessary, because no radioactivity is induced in hydrocarbons by irradiation. The presence of sulfur compounds in the olefin feed should be and is readily avoided by commercially used purification processes. If necessary, treatment to remove radioactivity can include storage to permit decay of radioactivity, or the use of ion exchange.

This invention is applicable to the radiation induced copolymerization of ethylene with other polymerizable unsaturated monomers, e.g. the vinyl aromatics, such as styrene and the methyl styrenes, and other olefins such as propylene and the butylenes.

EXAMPLE 1

Ethylene was polymerized in the presence and absence of di-tertiary butyl peroxide under the influence of radiation obtained from an artificially produced cobalt 60 source in the form of a hollow 2-inch pipe having a rating of about 3100 curies. The particular laboratory irradiation facility of conventional design has been described by J. F. Black et al. in an article received May 24, 1956, by the International Journal of Applied Radiation and Isotopes, vol. 1, No. 4, page 256, published January 1957. About 30 grams of the sample reaction mixture, contained in a stainless steel bomb, were placed near the radiation source such that the gamma ray intensity in the reaction zone was about 320,000 r./hr. The initial pressure of the reactants was about 1,000 p.s.i.g. and the radiations were carried out at room temperature, 25° C. The radiations were continued until a dosage of 30 megaroentgens had been received. One experiment was carried out in the absence of a peroxide, but in the presence of irradiation. Two grades of ethylene were used. One was a chemically pure ethylene (Mathieson C.P. grade), and the other was 95% pure ethylene which contained a small amount of paraffins but a lesser amount of oxygen than the C.P. grade.

Table I presents the results of these tests.

*Table I*

| Feed | Wt. Percent Peroxide [1] (on $C_2H_4$) | Final Pressure (p.s.i.g.) | Product | | | |
|---|---|---|---|---|---|---|
| | | | Yield, Wt. Percent (on $C_2H_4$) | Melt. Pt., °C. | Mol. Wt. | Appearance |
| 1. C.P. $C_2H_4$ [2] | | 850 | 31 | 113 | 4,500 | Snow-like white solid. |
| 2. C.P. $C_2H_4$ | 10 | 820 | 41 | 115 | 4,600 | Do. |
| 3. 95% $C_2H_4$ [2] | | 790 | 46 | 115 | 16,000 | Do. |
| 4. 95% $C_2H_4$ | 10 | 600 | 60 | 112 | 8,200 | Do. |
| 5. 95% $C_2H_4$ [3] | 10 | 1,000 | None | | | |
| 6. 95% $C_2H_4$ | [4] 10 | 850 | 0.5 | | | Liquid Product obtained. |

[1] Di-tertiary-butyl peroxide.
[2] Average of two runs.
[3] Control not irradiated.
[4] Tertiary butyl hydroperoxide used in this case only.

All Runs:
  Rate_____ 320,000 r./hr.
  Dosage_____ 30 megaroentgens.
  Initial Pressure_____ 1000 p.s.i.g.
  Temperature_____ 25° C.
  Oxygen contents of feed samples___ for C.P. ethylene, 320 parts per million; for 95% ethylene, 15 parts per million.

The infrared spectra analysis showed that the polymer obtained from run 2 contained approximately the same amount of unsaturation as the product formed in run 1.

These data definitely demonstrate the unique ability of di-tertiary-butyl peroxide to accelerate the polymerization of ethylene. In the case of the 95% ethylene feed, the molecular weight was reduced by the peroxide but the yield of useful product was greatly increased.

The difference in results between the C.P. ethylene, and the 95% ethylene is believed to be the result of the higher oxygen content of the C.P. ethylene, which inhibited the radiation polymerization. For this reason, it is preferred to use an ethylene feed substantially free of free oxygen, i.e., containing less than 100 parts per million of free oxygen.

EXAMPLE 2

Ethylene (the 95% pure grade) was polymerized in a procedure identical to that in Example 1 with the exceptions that the polymerization was carried out at 0° C. and the total radiation administered was 16 instead of 30 megaroentgens, 10 wt. percent of di-tertiary butyl peroxide markedly increased the yield of polyethylene at 0° C. as is shown in Table II.

*Table II*

| Temp., °C. | Additive | Yield, Wt. Percent on ethylene feed | Pressure in bombs after irradiation, p.s.i.g. | Melt. point, °C. | Molecular Weight |
|---|---|---|---|---|---|
| 0 | None | 27 | 950 | 119 | 9,000 |
| 0 | 10% DTBP | 36 | 835 | 120 | 10,500 |

EXAMPLE 3

Another set of ethylene polymerizations was carried out both with and without di-tertiary peroxide at −78° C. The total radiation dose was 30 megaroentgens. The rate of polymerization was very low at this temperature. Only 0.6% by weight of the original ethylene was converted to polymer in the control bomb while 0.7% by weight was converted in the bomb containing 10% di-tertiary butyl peroxide. In both cases the products were oily liquids.

Having described this invention, what is sought to be protected by Letters Patent is succinctly set forth in the following claims.

What is claimed is:

1. A process comprising polymerizing ethylene by exposure to high energy ionizing radiation at a rate of at least 100 equivalent roentgens per hour in the presence of a promoting amount, in the range of 0.01 to 15 weight percent, based on ethylene, of a di-tertiary-alkyl peroxide and obtaining a product having a molecular weight in the range of $10^2$ to $10^6$.

2. A process comprising polymerizing ethylene by exposure to sufficient high energy ionizing radiation at a rate of at least 100 equivalent roentgens per hour in the presence of 0.01 to 15 wt. percent, based on said ethylene, of a di-tertiary-alkyl peroxide, the alkyl radicals of said peroxide having from 1 to 10 carbon atoms, to obtain a product having a molecular weight in the range of $10^2$ to $10^6$.

3. The process of claim 2 wherein the pressure is in the range of 50 to 10,000 p.s.i.g., and the temperature is in the range of $-30°$ to $360°$ C.

4. The process of claim 2 wherein said high energy ionizing radiation is obtained from an artificially produced radioisotope, and the dose rate is above 100,000 roentgens per hour.

5. The process of claim 2 wherein said high energy ionizing radiation comprises neutrons from a nuclear reactor and wherein the neutron intensity in said reaction zone is at least $10^{10}$ n./cm.$^2$/sec.

6. A process for preparing polyethylene which comprises irradiating ethylene which is substantially free of free oxygen, in admixture with about 10 wt. percent of di-tertiary butyl peroxide, with gamma rays from cobalt 60 at an intensity of about 320,000 r./hr., a temperature of about 25° C., and a pressure of about 1,000 p.s.i.g., until a dosage of about 30 megaroentgens has been absorbed, and recovering a solid polymeric product.

7. The process of claim 1 wherein said ethylene during the irradiation is substantially free of free oxygen.

8. The process of claim 1 wherein the ethylene during the irradiation is maintained at room temperature.

References Cited in the file of this patent

UNITED STATES PATENTS

| | | |
|---|---|---|
| 2,409,996 | Roedel | Oct. 22, 1946 |

FOREIGN PATENTS

| | | |
|---|---|---|
| 714,843 | Great Britain | Sept. 1, 1954 |
| 587,378 | Great Britain | Apr. 23, 1947 |
| 584,794 | Great Britain | Jan. 27, 1947 |

OTHER REFERENCES

Gerhart et al.: "Polymer Processes," page 777, pub. by Interscience, vol. X (1956).

Nature, vol. 160, August 23, 1947, pages 268–269.